Patented June 27, 1933

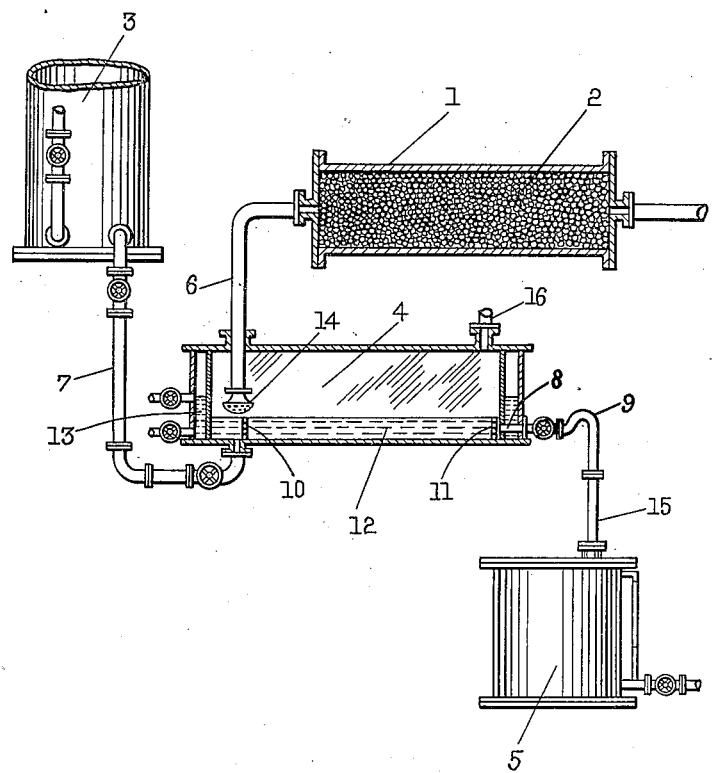

1,915,572

UNITED STATES PATENT OFFICE

STANLEY JOSEPH GREEN AND RONALD RUMSEY WIDDOWSON, OF SPONDON, NEAR DERBY, ENGLAND, ASSIGNORS TO CELANESE CORPORATION OF AMERICA, A CORPORATION OF DELAWARE

MANUFACTURE OF ALIPHATIC ACID ANHYDRIDES

Application filed January 5, 1929, Serial No. 330,576, and in Great Britain January 28, 1928.

This invention relates to the manufacture of aliphatic anhydrides from aliphatic acids.

In Bulletin de la Société Chimique de France Vol. XXXI pages 113–118 experiments are described by Peytral wherein acetic acid vapour is passed through platinum tubes heated to about 1150° C. In these experiments when the acid vapour was passed in a rapid stream, small quantities (less than 2%) of acetic anhydride were obtained and the decomposition to hydrocarbons or other gaseous products was small, the major part of the acetic acid being recovered unchanged on condensation of the reaction vapours; with decreased speed of passage of the acetic acid vapours, however, no acetic anhydride was produced and very considerable quantities of gaseous decomposition products (hydrocarbons, hydrogen, CO and $CO_2$) were formed. It would seem from these experiments that in the case where acetic anhydride was produced with but small decomposition to gaseous products, the acid vapour was passed through the platinum tubes much too fast to allow it to attain a temperature of 1150° C., and that when, owing to slower passage of the acid vapour, the acid vapour was allowed to attain high temperatures, the reaction was more violent and the sole products of the reaction were gaseous products such as hydrocarbons, CO, $CO_2$ etc. Our experiments have confirmed this view and we have found when passing acetic acid through platinum tubes in such manner that the acetic acid vapour attains a temperature of even 700° to 800° C. very considerable decomposition to gaseous products occurs. It is therefore evident that when Peytral produced acetic anhydride with but slight decomposition to gaseous products, the acetic acid vapour must only have attained a temperature below 700° to 800° C.

Following the publication of Peytral's experiments various proposals have been made, in particular in regard to catalysts for the reaction.

In our researches in this connection we have found that alkali metal tungstates are useless as catalysts for the reaction. We have found for instance that sodium tungstate causes complete destruction of acetic acid vapour even at temperatures of about 500° C.

We have now made the surprising discovery that highly satisfactory results are obtained if the reaction is performed in the presence of a tungstic compound more acidic than an alkali tungstate (i. e. tungstic acid or tungstates other than alkali tungstates), and we have found that the following of such tungstic compounds are especially useful catalysts for the reaction:—tungstates of calcium, magnesium or other alkali earth metals.

According to the present invention therefore we produce aliphatic anhydrides (and especially acetic anhydride) by subjecting aliphatic acid vapour (and especially acetic acid vapour) to the action of heat in presence of a catalyst consisting of or comprising a tungstic compound more acidic than an alkali tungstate, and especially one or more tungstates of calcium, magnesium or other alkali earth metals.

If desired, the catalyst may be spread or deposited upon a filler or carrier such for instance as pumice (preferably granulated pumice stone), kieselguhr, carborundum or the like.

The process may be performed at temperatures of from about 400° to 700° C., and preferably from about 550° to 650° C.

The acetic acid vapour, or other aliphatic acid vapour, may be subjected to the reaction in any suitable manner. Conveniently it may be passed in a rapid stream through any convenient form of apparatus (for instance one or more tubes or other reaction vessels) containing the catalyst and heated to the desired temperature. The tubes or other form of apparatus may be made of or lined with any suitable material, such for instance as fused silica, copper, gold, silver, graphite or certain alloy steels. Instead of heating the tubes or other form of apparatus the necessary heat may be applied directly to the catalyst, for instance, by heating the same electrically, and, as before mentioned, the catalyst may, if desired, be deposited upon or spread upon fillers or carriers.

We have found that by performing the process under reduced pressure or "vacuum" and/or by diluting the aliphatic acid vapour with indifferent gases (for instance nitrogen, carbon dioxide or the like) decomposition to gaseous products may often be avoided and higher efficiency obtained. It will, however, be understood that we do not limit ourselves in regard to the pressure to be employed in the process.

The anhydride produced by the process may be separated and recovered from the reaction gases or vapours in any suitable way. In order to avoid hydrolysis and consequent loss of anhydride the vapours are preferably not submitted to simple condensation but are treated to separate the anhydride from the water vapour present or formed in the reaction. For instance the gases or vapours from the reaction zone may be subjected to separation in the manner described in British Patent No. 303,772 of July 7, 1927 and in corresponding United States application S. No. 284,566 filed June 11, 1928, that is to say the anhydride may be condensed from the reaction vapours whilst carrying away the water by the vapour of one or more entraining liquids. In such form of execution the reaction vapours are preferably mixed after leaving the reaction zone with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. Examples of entraining liquids which we may use for such method of condensation are, as indicated in the said British Patent No. 303,772 and corresponding United States application S. No. 284,566 filed June 11, 1928, benzene, carbon tetrachloride, petrol, mixtures of two or more of such bodies, or mixtures of ether and petroleum ether; it will be understood, however, as explained in the said British Patent No. 303,772 and corresponding United States application S. No. 284,566 filed June 11, 1928, that any other liquids chemically inert to the anhydride and having a high entraining capacity for water may be employed. The liquids should preferably have a low entraining capacity for the anhydride.

Or, for instance, the reaction vapours may be subjected to condensation by the method described in British Patent No. 298,667 of July 14, 1927, and corresponding United States application S. No. 285,613 filed June 15, 1928, that is to say they may be subjected to condensation by leading them under the surface of an "extracting" liquid cooled down or otherwise kept at temperatures below (and preferably considerably below) the boiling point of water. As explained in the said British Patent No. 298,667 and corresponding United States application S. No. 285,613 filed June 15, 1928, by the term "extracting" liquid is meant a liquid or liquid mixture in which the anhydride is soluble and which is chemically inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol or its homologues; as stated in the said British Patent No. 298,667 and corresponding United States application S. No. 285,613 filed June 15, 1928, it is preferable to use as "extracting" liquids, liquids of the character referred to which are themselves hydrocarbons or which contain hydrocarbons, for example, benzene or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following particular examples of "extracting" liquids are very suitable:—ether in admixture with petroleum ether, chloroform mixed with petroleum ether and/or gasoline; and mixtures of ether and petroleum ether containing about 30 to 50% petroleum ether are especially suitable.

Or, for instance, the reaction vapours may be subjected to condensation by the method described in British Patent No. 310,863 of January 28, 1928, i. e. the reaction vapours may be caused to impinge upon a flowing stream of benzene (or other water insoluble solvent for the anhydride) whereby said vapours are quickly cooled and condensed and the anhydride separated from the water. The benzene or the like so employed may be collected and the water layer (usually the lower layer, which separates out may be removed and the benzene (or equivalent) layer distilled to recover the anhydride.

Or, for instance, the anhydride may be separated from the reaction vapours by the method described in British Patent No. 256,663 of April 9, 1925, and corresponding United States Patent No. 1,735,957, i. e. they may be subjected to fractional condensation immediately on leaving the hot reaction zone, for instance, they may be passed up one or more fractionating columns whereby the anhydride is condensed and the water allowed to pass on in vapour form.

It will of course be understood that in cases where the reaction is performed under pressures higher than atmospheric pressure, the reaction gases or vapours should, prior to treatment for separation or recovery of the anhydride, preferably be passed through suitable apparatus (for instance, one or more reducing valves) wherein the pressure is reduced substantially to normal atmospheric pressure.

It will be understood that the invention is not limited as to the strength of aliphatic acid employed. The process can be performed even with the vapours of dilute acids; and besides affording a ready means for the manufacture of anhydrides from concentrated or highly concentrated acids, it affords valuable means for producing anhydrides from waste or dilute acids, especially waste or dilute acetic acids such as result from the acetylation of cellulose or other industrial acetylation processes.

The following examples serve to illustrate some forms of execution of the process, it being understood that they are given only by way of illustration and are in no way limitative.

Example 1

A highly useful catalyst for use in the present invention may be prepared as follows:—

A solution of calcium chloride is mixed with a solution of sodium tungstate. The resulting precipitate of calcium tungstate is washed free from soluble compounds (such as sodium chloride) by repeated extraction with water. The catalyst so obtained is then dried and may be employed as such or spread upon a solid support such as granulated pumice.

Example 2

Glacial acetic acid is boiled and the resulting vapours conducted in a rapid stream through a tube (composed of or lined with copper, silver, gold or platinum) filled with the catalyst prepared in accordance with Example 1 (such catalyst being preferably spread upon granulated pumice stone) and heated to 550° to 650° C. The gases or vapours on leaving the tube are caused to impinge on a flowing stream of cold benzene whereby they are quickly cooled and condensed. The benzene stream is collected in a suitable vessel and the water layer (usually the bottom layer) separated therefrom, and the benzene layer (usually the top layer) fractionally distilled to recover the acetic anhydride.

Example 3

A rapid current of carbon dioxide is passed through or over hot (or preferably boiling) acetic acid. According to the temperature of the acetic acid the carbon dioxide will become charged with a definite proportion of acetic acid vapour. The mixture of acetic acid vapour and carbon dioxide so obtained is then subjected to the reaction as in Example 2 and the anhydride recovered from the reaction gases or vapours as in Example 2.

The accompanying diagrammatic drawing serves to illustrate a convenient form of apparatus for executing the invention in accordance with the above examples. For convenience the following description is given in terms of apparatus containing a particular constructional material and a particular catalyst, it is to be understood however that other constructional materials or catalysts may, if desired, be employed.

Referring to the drawing, 1 is a tube composed of copper and filled with the catalyst 2, this catalyst being composed of calcium tungstate prepared in accordance with Example 1 and spread upon granulated pumice. 3 is a supply tank containing benzene. 4 is a jacketed condensation vessel and 5 a receiver. In operation the acetic acid vapour, or the mixture of acetic acid vapour is passed in a rapid stream through the tube 1, this tube being heated to a temperature between 550° and 650° C. From the tube 1 the vapours pass via the pipe 6 to the condensation vessel 4. Benzene is run from the supply tank 3 via the pipe 7 to the condensation vessel 4 across which vessel it passes in a rapid stream to the outlet pipe 8 which pipe is provided with a constant level overflow 9 serving to maintain a substantially constant level in the vessel 4. Perforated baffles 10 and 11 are provided in the vessel 4 to ensure even flow of the benzene 12 across the vessel 4. The vessel 4 is cooled by the circulation of cold water or brine through the jacket 13 in such manner as to keep the benzene 12 in the vessel 4 at a temperature below 20° C. The reaction vapours leave the pipe 6 through the nozzle 14 which causes them to impinge in fine streams on to the stream of benzene 12 in the vessel 4. The reaction vapours are condensed on coming into contact with the stream of benzene and the anhydride separated from the water to a very efficient extent, the anhydride (together with any unconverted acetic acid) dissolving in the benzene whilst the water is condensed and separated. The benzene, together with the dissolved anhydride and separated water, passes via the constant level overflow 9 and the pipe 15 to the receiver 5 wherein the liquid separates into two layers, the water forming the lower layer whilst the benzene and dissolved anhydride (and unconverted acetic acid) form the upper layer. The anhydride can readily be recovered by distillation of the benzene layer.

Any uncondensable gases in the reaction vapours escape from the vessel 4 by the pipe 16 and gasses so escaping may be treated in any suitable way to recover any anhydride carried over by them.

What we claim and desire to secure by Letters Patent is:—

1. Process for the manufacture of an aliphatic anhydride which comprises thermally decomposing vapors of an aliphatic acid in presence of a catalyst comprising a tungstic compound more acidic than an alkali tungstate.

2. Process for the manufacture of acetic anhydride which comprises thermally decomposing acetic acid vapor in presence of a catalyst comprising a tungstic compound more acidic than an alkali tungstate.

3. Process for the manufacture of an aliphatic anhydride which comprises thermally decomposing the vapor of an aliphatic acid in presence of an alkali earth metal tungstate.

4. Process for the manufacture of acetic anhydride which comprises thermally decomposing acetic acid vapor in presence of an alkali earth metal tungstate.

5. Process for the manufacture of acetic anhydride which comprises thermally decomposing the acetic acid vapor in presence of calcium tungstate.

6. Process according to claim 1 and wherein the reaction is performed at temperatures between 400° and 700° C.

7. Process for the manufacture of acetic anhydride which comprises subjecting the vapors of acetic acid to a temperature between 400° and 700° C. in presence of an alkali earth metal tungstate.

8. Process for the manufacture of an aliphatic anhydride which comprises thermally decomposing the vapor of an aliphatic acid by passing said vapor in contact with a heated tungstic compound more acidic than an alkali tungstate, supported upon a carrier.

9. Process for the manufacture of an aliphatic anhydride which comprises thermally decomposing the vapor of an aliphatic acid by passing said vapor in contact with a heated tungstic compound more acidic than an alkali tungstate, supported upon granulated pumice.

10. Process for the manufacture of an aliphatic anhydride which comprises thermally decomposing the vapor of an aliphatic acid by passing said vapor in contact with a heated alkali earth metal tungstate, supported upon a carrier.

11. Process for the manufacture of an aliphatic anhydride which comprises thermally decomposing the vapor of an aliphatic acid by passing said vapor in contact with calcium tungstate, supported upon a carrier.

12. Process for the manufacture of an aliphatic anhydride which comprises thermally decomposing the vapor of an aliphatic acid by passing said vapor in contact with calcium tungstate, supported upon granulated pumice.

13. Process for the manufacture of acetic anhydride which comprises thermally decomposing acetic acid vapor by passing said vapor in contact with calcium tungstate heated to 550°—650° C., supported upon granulated pumice.

14. Process according to claim 1 and wherein the reaction vapors are treated to separate the anhydride from the water vapor present therein.

In testimony whereof we have hereunto subscribed our names.

STANLEY JOSEPH GREEN.
RONALD RUMSEY WIDDOWSON.